(12) United States Patent
Amels et al.

(10) Patent No.: US 12,286,942 B2
(45) Date of Patent: Apr. 29, 2025

(54) ELECTRICALLY POWERED SUPERSONIC AND HYPERSONIC PROPULSOR

(71) Applicant: ILIGHT, INC., Secaucus, NJ (US)

(72) Inventors: David Anthony Amels, Wood-Ridge, NJ (US); Stephen Michael Legensky, Rutherford, NJ (US)

(73) Assignee: ILIGHT INC., Secaucus, NJ (US)

( * ) Notice: Subject to any disclaimer, the term of this patent is extended or adjusted under 35 U.S.C. 154(b) by 0 days.

(21) Appl. No.: 18/518,558

(22) Filed: Nov. 23, 2023

(65) Prior Publication Data

US 2024/0167418 A1    May 23, 2024

Related U.S. Application Data

(60) Provisional application No. 63/427,774, filed on Nov. 23, 2022.

(51) Int. Cl.
| | |
|---|---|
| *F02K 7/10* | (2006.01) |
| *B64G 1/40* | (2006.01) |
| *F02C 6/00* | (2006.01) |
| *F02K 7/14* | (2006.01) |
| *F02K 7/16* | (2006.01) |
| *F02K 9/00* | (2006.01) |
| *F03H 1/00* | (2006.01) |

(52) U.S. Cl.
CPC .............. *F02K 7/10* (2013.01); *B64G 1/4005* (2023.08); *B64G 1/409* (2013.01); *B64G 1/411* (2023.08); *F02C 6/00* (2013.01); *F02K 7/14* (2013.01); *F02K 7/16* (2013.01); *F02K 9/00* (2013.01); *F03H 1/0081* (2013.01); *F03H 1/0093* (2013.01)

(58) Field of Classification Search
CPC ..... F03H 1/0093; F03H 1/0081; B64G 1/411; B64G 1/4005; B64G 1/409; B64C 30/00; F02K 3/08; F02K 7/10; F02K 7/14; F02K 7/16; F02C 1/05
See application file for complete search history.

(56) References Cited

U.S. PATENT DOCUMENTS

| | | | | |
|---|---|---|---|---|
| 3,206,925 | A * | 9/1965 | Schiff | F03H 1/00 219/121.11 |
| 4,334,136 | A * | 6/1982 | Mahan | D06F 58/266 219/722 |
| 6,887,339 | B1 * | 5/2005 | Goodman | H01J 37/32082 156/345.47 |

(Continued)

*Primary Examiner* — Kyle Robert Thomas
(74) *Attorney, Agent, or Firm* — Metropolis IP Group, LLC; Eric Kang

(57) ABSTRACT

A system for electromagnetically exciting certain molecules within a volume of gaseous working fluid or charge via transition frequency heating for propulsion, comprising an electrical energy source (EES), an electromagnetic wave generator (EWG), a reflection coefficient measurement device (RCMD), a controllable electrical matching network (EMN), a proportional integral derivative controller (PIDC), and a propulsor cavity (PC), wherein said PC further comprises a transmission line that comprises a waveguide and a radio frequency (RF) window, wherein said RF window provides optical access to a heating zone where the charge resides or passes through, wherein said heating zone resides in the flow path between a propulsion system's charge inlet and nozzle exhaust.

19 Claims, 4 Drawing Sheets

(56) References Cited

U.S. PATENT DOCUMENTS

| | | | | |
|---|---|---|---|---|
| 6,993,898 B2 * | 2/2006 | Parkin | ................. | F03H 3/00 |
| | | | | 244/62 |
| 9,764,648 B2 * | 9/2017 | Finodeyev | ............. | B60L 50/53 |
| 11,231,023 B2 * | 1/2022 | Siddiqui | ................ | B64G 1/402 |
| 11,384,712 B1 * | 7/2022 | Bakos | ................. | F02K 7/14 |

* cited by examiner

ELECTRICALLY POWERED SUPERSONIC AND HYPERSONIC PROPULSOR

CROSS-REFERENCE TO RELATED APPLICATIONS

The present application claims priority to provisional patent application No. 63/427,774 filed on Nov. 23, 2022, disclosures of which are incorporated herein at least by reference.

FIELD OF THE INVENTION

The present invention generally relates to systems and methods for propulsion. More specifically, the present invention relates to the employment of an electrically powered, air-breathing jet propulsion system for supersonic and hypersonic flight.

BACKGROUND OF THE INVENTION

Current powered supersonic and hypersonic air vehicles have propulsion systems that produce thrust from a charge consisting of chemical fuel and oxidizer. One class of propulsion systems, "air-breathing," sources the oxidizer from ambient air ingested through the inlet of a turbine engine, ramjet, or supersonic combustion ramjet ("scramjet") engine. Shortly afterward, the air is mixed with a suitable liquid fuel, ignited, burned, and scavenged at a higher enthalpy state through an appropriate exhaust nozzle to produce thrust.

For engines operating in flight regimes about Mach (M)=1, the air undergoes a series of compressions from shocks that successively slow the flow while increasing its temperature and pressure. In a ramjet that powers vehicles efficiently in the mid to high supersonic regime, the air is slowed to subsonic speeds by the time it enters the combustor. In a scramjet that powers vehicles from M~6 and higher, the air is slowed to supersonic speeds by the time it reaches the combustor inlet.

Combustion can only occur in a narrow range of fuel-to-oxidizer mixture ratios, where the exact ratio is governed by the fuel and oxidizer stoichiometry. The necessity to maintain these precise ratios is essential for sustained combustion. In addition, the high enthalpy of the inlet air leads to many different chemical species of oxygen in different states of excitation, making the proper mix for combustion unreliable. Most of all, ignition and flame stabilization aspects of combustion have proven to be difficult over the wide range of flow conditions found during supersonic and especially hypersonic flight, due to challenges with fuel-oxidizer mixing at the molecular level that is associated with high subsonic to supersonic combustion.

With respect to the more extreme hypersonic flight regime, if a representative scramjet in hypersonic flight has a characteristic combustor length of $L_c$~1 to 2 meters and the charge speed through the combustor is $U_{air}$~1000 to 2000 meters/second, then molecular fuel-oxidizer mixing, ignition, and reaction all need to occur within a short residence time window of $L_c/U_{air}$~1 millisecond. Supersonic combustion in a scramjet is a mixing limited or mixing controlled process because the ignition ($\tau_{ig}$~7-130 μs for $H_2$-air) and reacting ($\tau_{ch}$~30-150 μs for $H_2$-air) time scales are far smaller than the mixing time scale ($\tau_{mix}$).

One of the largest issues with fuel-oxidizer mixing for these applications is as flight Mach number increases, flow compressibility increases, which in turn reduces the growth of the turbulent mixing shear layer formed between the fuel and oxidizer streams due to the suppression of upstream and cross-stream communication and the attenuation of instability amplification factors [1]. In fact, the adverse impact of compressibility on increasing the mixing timescale ($\tau_{mix}$) becomes more rapidly pronounced as the Mach number rises beyond 0.5; hence even portions of the subsonic regime where fuel-oxidizer mixing takes place in ramjet propulsions systems can be a challenge.

Once the fuel-oxidizer reaction is initiated, the heat release process itself also reduces the mixing shear layer growth rate and works to inhibit the mixing of the remaining unburnt fuel and oxidizer. This is because the reaction heat release is an outward displacement velocity or dilatation. This outward, spreading velocity runs counter to mixing entrainment which is velocity coming inward.

One of the manifestations of the supersonic mixing problem is an extremely thin, sliver-like reaction layer along the length of the combustor that is much narrower than the combustor [2]. The unsurprising consequence then becomes that many hypersonic propulsion systems need to be very long spatially in order to mix, ignite, and burn the requisite fuel-air charge to achieve the desired thrust. Long propulsion systems, in turn, open design challenges with thermal management and aerodynamic drag by skin friction. Measures like adding reaction catalysts such as nitrogen monoxide do not ameliorate this issue because of the high Dahmköhler number regime of this flow; as one can surmise from earlier remarks, speeding up the chemical kinetics will not address the issues that are mainly driven by the relatively slow mixing timescale.

Because of the difficulties of fuel-oxidizer mixing associated with scramjets, and a myriad of mixing enhancement strategies or techniques including:
- Passive methods related to streamwise vortex generation such as ramps, lobe/hypermixers, aero-ramps, swirl vanes, etc.
- Passive methods related to increasing the residence time of the charge in the combustor including cavities, backward-facing steps, upstream fuel injection, etc.
- Active methods such as a vibrating/splitting wire, pulse jet, Helmholtz resonators, piezoelectric actuators, acoustic excitation, wavy wall topology, flip-flop nozzle, etc.
- Transverse fuel injection in supersonic crossflow is also used to better penetrate the flow domain, which may lead to improved mixing. However, the tradeoff with this and some other method enhancement strategies is mixing improvement is not independent of total pressure losses. If the strategy has a one percent total pressure loss penalty, the resultant thrust loss will be around one percent, which is a strong consideration given that air capture drag is a substantial fraction of the delivered nozzle thrust.

Another large problem with some of the mixing enhancers is scalability. Certain systems are less appropriate in larger and larger scale systems. A cavity mixing enhancer, which serves only to increase the residence time of the charge to augment mixing is not efficient to implement in larger-scale combustors.

Other methods such as complex injection strategies/geometries may be a prohibitively expensive due to the developmental complexities of requiring a wide optimization search space from many geometric and flight condition permutations. Questions about the system response to changes in flight conditions such as freestream Mach or vehicle angle-of-attack and inlet designs would likely require years of experimentation to answer.

Molecular mixing is also very difficult to study. There are no rigorous analytical foundations for molecular mixing. Digitally simulating molecular mixing is equally problematic. Molecular dynamic simulations are extremely resource-intensive at molecular number densities associated with air-breathing flight regimes. Computational Fluid Dynamic (CFD) Direct Numerical Simulation (DNS) for modeling molecular mixing is prohibitively expensive due to the range of dynamic scales at very high supersonic or hypersonic Reynolds numbers (e.g., the ratio of the largest and smallest length scales varies with the Reynolds number raised to the power of 0.75) and the molecular diffusion-dominated Batchelor scale. Physical experiments also cannot alleviate issues here as the current state-of-the-art optical diagnostics are unable to characterize mixing at the Batchelor scale.

Finally, combustion-based propulsion systems require a certain amount of dynamic pressure to sustain combustion. This imposes maneuverability limits especially under cruise conditions, especially when the vehicle is pitching up in an angle-of-attack where dynamic pressure through the engine inlet would drop. If the maneuver happens quickly, the dynamic pressure will drop fast enough to "flame out" the engine.

SUMMARY OF THE INVENTION

The present invention demonstrates an easier-to-design/optimize, more reliable, and controllable supersonic and hypersonic propulsion system than ones that are dependent on mixing and combustion. Hence, the present invention allows supersonic and hypersonic vehicle producers to focus resources on a large range of remaining issues such as high-temperature materials, multi-disciplinary optimization, stability and control with aerothermoelastic considerations, testing, and numerous other challenges. Because chemical combustion may not be used in certain embodiments of the present invention, there is a greater potential for stealth if the application requires such attributes since the exhaust observables will be optically dim thanks to the complete lack or extremely low concentrations of water, carbon monoxide, carbon dioxide, alumina particles, soot, and hydroxyl species that emit/absorb in the InfraRed sensing bands. Therefore, the present invention enables powered supersonic/hypersonic cruise missiles to be as hard to optically detect as supersonic/hypersonic glide vehicles.

The disclosure is drawn to systems and methods for propulsion that use a millimeter-wave radio frequency source that exploits the principle of transition frequency heating of molecules of one or more gas species in a gaseous working fluid rather than combustion to achieve the transfer of energy to a working fluid to perform work for propulsion of a supersonic and/or hypersonic vehicle. In an aspect of a certain embodiment of the present invention, there exists an absorption window for oxygen molecules at a frequency of 60 GHz due to its non-zero spin which causes its ground state to split into a couple of closely separated levels. The line spacing of this splitting (fine structure) corresponds to approximately 60 GHz. When radio frequency energy of this frequency is applied to oxygen molecules, it causes the molecules to jump between these fine structures and changes the molecule's rotation, thus imparting kinetic energy to the molecule and causing its heating. This heating in turn causes the kinetic energy and hence pressure of the working fluid to increase and produce thrust. Hence, this system, hereinafter called an Electrically Powered High-speed Vehicle Propulsor ("EPHVP"), uses only electrical energy as its source of power. Embodiments of the EPHVP can be applied toward hypersonic-only as well as supersonic and hypersonic propulsion systems.

BRIEF DESCRIPTION OF THE DRAWINGS

The drawings are provided to facilitate understanding in the detailed description. It should be noted that the drawing figures may be in simplified form and might not be to precise scale. In reference to the disclosure herein, for purposes of convenience and clarity, only directional terms such as top, bottom, left, right, up, down, over, above, below, beneath, rear, front, distal, and proximal are used with respect to the accompanying drawings. Such directional terms should not be construed to limit the scope of the embodiment in any manner. System schematics are not meant to convey an accurate perspective or proportional form, but rather to illustrate the elements that are present in the system in a more visually intuitive manner than a rudimentary block diagram listing. Portions of certain figures are accompanied by icons depicting actions, processes, process states, and items. These icons are meant to efficiently convey information in an impactful and potentially more universal manner. Any ambiguity in an icon's meaning is clarified by content provided in the DETAILED DESCRIPTION OF THE INVENTION and not be construed to limit the scope of the embodiment in any manner. Embodiments of the methods and systems represented in the drawings as block diagrams and flowcharts are illustrations of methods.

DETAILED DESCRIPTION OF THE INVENTION

Figure 1:
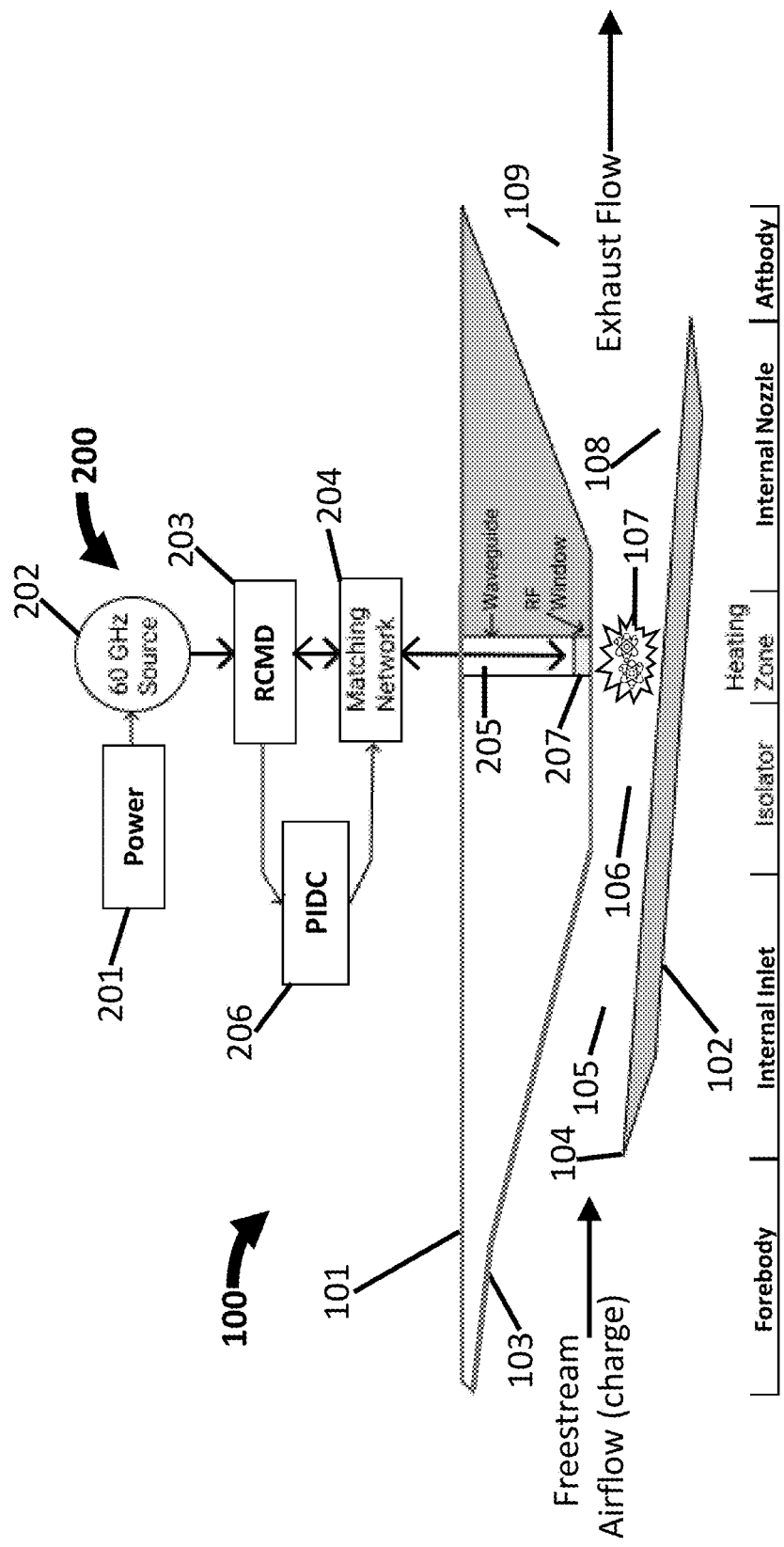
FIG. 1 is a center section schematic showing an embodiment of an airframe integrated duct in a hypersonic vehicle and its propulsion system, the EPHVP system, and block diagrams of a method embodiment of the EPHVP
Figure 2:
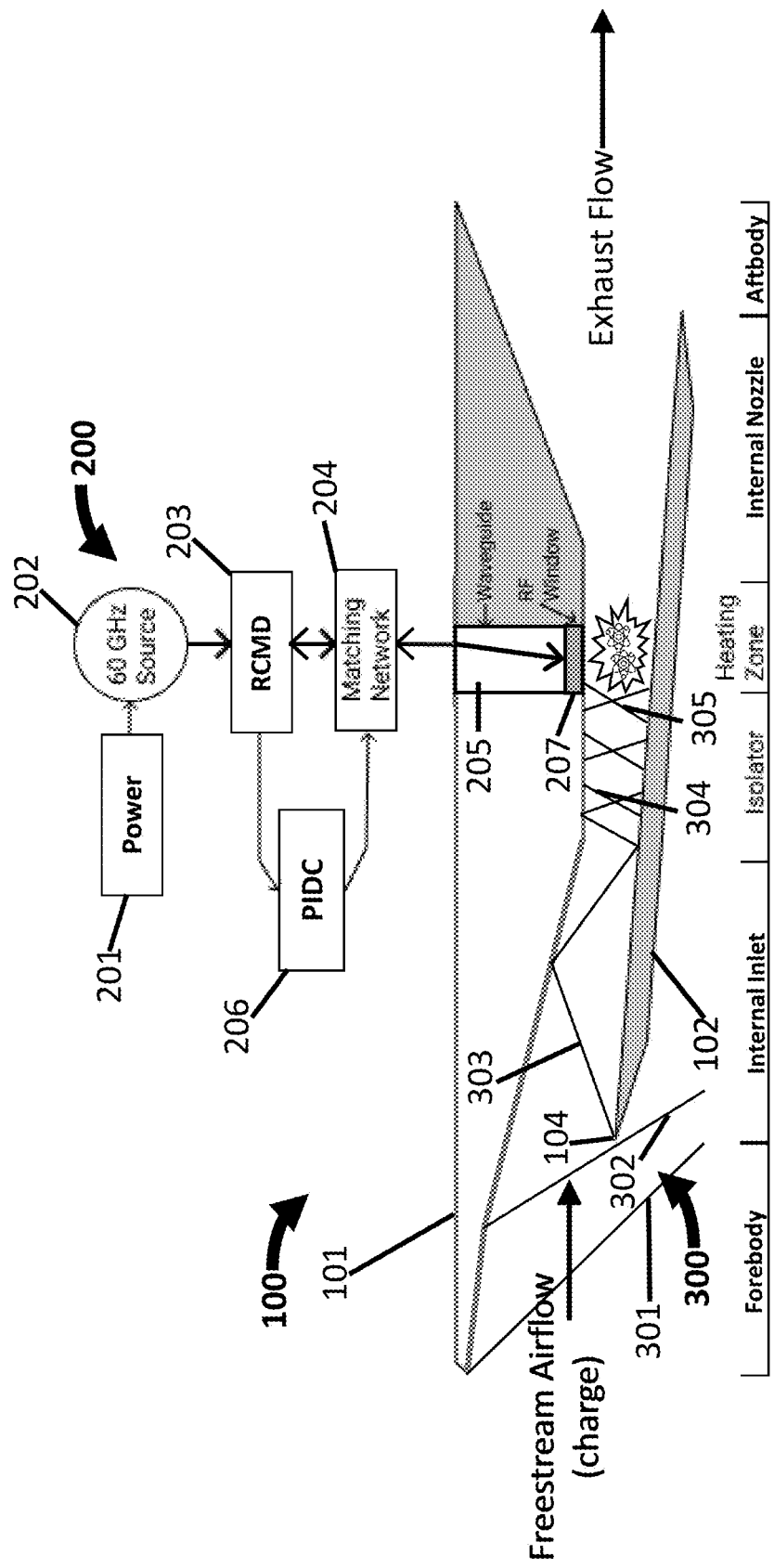
FIG. 2 is a center section schematic showing an embodiment of an airframe integrated duct in a hypersonic vehicle and its propulsion system, the EPHVP system, block diagrams of a method embodiment of the EPHVP, a notional shock compression and expansion sequence, and the preferred configuration embodiment that shows the final inlet shock under the directed microwave energy field

I) HYPERSONIC VEHICLE 100, EPHVP 200, and SHOCK SEQUENCE 300—Ref. FIGS. 1 and 2: FIG. 1 depicts a side profile view/schematic of a representative powered hypersonic vehicle 100 whose airframe is integrated with the duct and propulsion system. The various sections of the vehicle 100 are indicated at the bottom of FIG. 1. The vehicle 100 comprises an onboard EPHVP 200, whose system components and method are shown schematically in FIG. 1, which further comprises an electrically powered millimeter-wave generator rather than combustion of a fuel-air mixture to generate nozzle thrust.

The vehicle 100 comprises a main body 101 connected to a ducted housing 102. Since FIG. 1 is a center section view, the structural integration between the main body 101 and ducted housing 102 is not apparent in FIGS. 1 and 2.

The propulsion system's charge-flow pathway begins with the freestream with neutrally charged oxygen ("$O_2$") charge flowing toward the forebody 103 or external inlet where the shock sequence to progressively reduce the flow Mach is set up. It begins with a shock 301 (shown in FIG. 2) off the leading edge of the forebody 103. Depending on the sought condition (i.e., charge residence time during microwave excitation) at the downstream heating zone 107, the forebody may have what is known as compression ramps along its charge-wetted surface to induce additional shock(s) 302 that form along characteristic(s) as close to the cowl lip 104 as possible to reduce spillage drag. The cowl lip 104, which marks the leading edge of the internal inlet 105, itself sets up an oblique shock 303 that alternates to expansion and compression waves for every subsequent downstream reflection along the walls of the duct.

Downstream of the internal inlet 105, is an isolator 106 which is designed to prevent inlet unstart by providing sufficient additional adiabatic compression above its entry pressure to match the backpressure created in the heating zone 107. If the heating zone backpressure is high enough to separate the boundary layer in the isolator 106, a shock train 304 is created that leads to further pressure recovery and air temperature increase. Preferably, the maximum heating zone entrance air temperature is no more than an approximate range of 2600-3000 R or 1440-1670 K, to prevent disassociation of pre-heating zone air. The disassociation of air is an endothermic process, which reduces the temperature and sets up a condition for non-equilibrium expansion losses. This is because the energy "locked up" in the disassociation process cannot keep up with the rapid gas dynamic expansion and be converted back to the charge's molecular kinetic energy, resulting in a thrust loss.

The flow speed that enters the heating zone 107 is also based on internal aerothermal-structural limitations as well as the requirement for sufficient time for the $O_2$ to be heated to the level required for the sought-after delivered thrust. For example, in the hypersonic flight regime, the shock system 302-305 may be designed to successively slow the internal flow entering the heating zone 107 to no less than the supersonic regime in order to temper thermal loading and management issues. After the $O_2$ molecules are heated and pressure is increased, the charge is expanded and accelerated through an internal diverging nozzle 108 and, for certain vehicle embodiments, an aftbody-bounded external nozzle 109 for semi-unbounded expansion, where thrust to sustain supersonic and hypersonic vehicle flight is generated.

II) EPHVP SYSTEM AND METHOD (200) OVERVIEW—Ref. FIGS. 1-4: The EPHVP 200 system and method comprise an electrical energy source (EES) 201, which supplies an electromagnetic wave generator (EWG) 202 and other components of the system (203-207) suitable power/signal. If the charge contains diatomic oxygen ($O_2$), then the signal generated by the EWG 202 is a 60 GHz millimeter wave; this is the preferred embodiment for air-breathing propulsion systems. The EWG 202 is coupled to a reflection coefficient measurement device (RCMD) 203 that measures the reflection coefficient(s) between the EWG and the load based on the state of the molecules targeted for microwave excitation ($O_2$ molecules in the preferred embodiment) in the heating zone 107 of the propulsor's charge flow.

Reflection coefficient(s) can be based on a standing-wave ratio (SWR) or alternatively the voltage SWR (VSWR). In this instance or embodiment, the RCMD 203 would be a standing-wave ratio (SWR) sensor. SWR sensors are well-known in the art of electrical power systems design. The SWR sensor 203 as implemented in the EPHVP 200 system comprises an RF test instrument such as a vector network analyzer (VNA), one or more directional couplers, antennae bridge circuits, or a combination of one or more directional couples and bridge circuits, etc.

The SWR is the ratio of the forward-to-reflected voltage or the maximum voltage divided by the minimum voltage on the transmission line. The SWR sensor 203 measures how closely or how poorly the impedance of a load matches the characteristic impedance of a transmission line or waveguide. Standing waves along a transmission line are caused by these impedance mismatches.

Alternatively, the reflection coefficient(s) may be derived from the measurement of an S11 parameter, which gauges the efficiency of RF power transmission by quantifying how much power of an incident wave or delivered microwave signal is reflected back along the transmission line from a load. In this embodiment, the RCMD 203 measuring this parameter may be a VNA, and the S11 parameter is a complex number that describes both the magnitude and the phase shift of the reflection.

A controllable electrical matching network (EMN) 204 facilitates the efficient delivery of energy to the propulsor cavity (PC). The PC comprises a waveguide 205 to direct the microwave energy and a radio frequency (RF) window 207 to provide both optical access to the heating zone 107 and protective isolation of the system components from the charge and other external elements. A preferred embodiment of the EPHVP is such that the field intensity is high at the final inlet shock 305 since that area would likely be a higher concentration of the $O_2$ species due to pressure, as shown in FIG. 2.

A proportional integral derivative controller (PIDC) 206 is employed to continuously monitor the reflection coefficient(s) provided by said RCMD 203. The PIDC 206 then controls how the EMN 204 can adjust the forward signal to achieve the requisite active charge heating most efficiently. Active charge heating is accomplished by electromagnetically exciting the target molecules within the propulsor's charge flow in the heating zone 107.

To summarize the relation of components in FIGS. 1-2, the EPHVP 200 system of the present invention is configured such that said EES 201 supplies power to said EWG 202. The EWG 202 is electrically coupled to said RCMD 203, wherein said RCMD 203 is electrically coupled to said EMN 204 and said PIDC 206. The PIDC 206 is electrically coupled to said EMN 204. The EMN 204 is electromagnetically coupled to the PC, wherein a transmission line comprises an electromagnetic connection from said RCMD 203 through said PC to the heating zone 107. The forward and reflected signals can be propagated between the RCMD 203, EMN 204, waveguide 205, and RF window 207, as shown in FIGS. 1 and 2.

Figure 3:
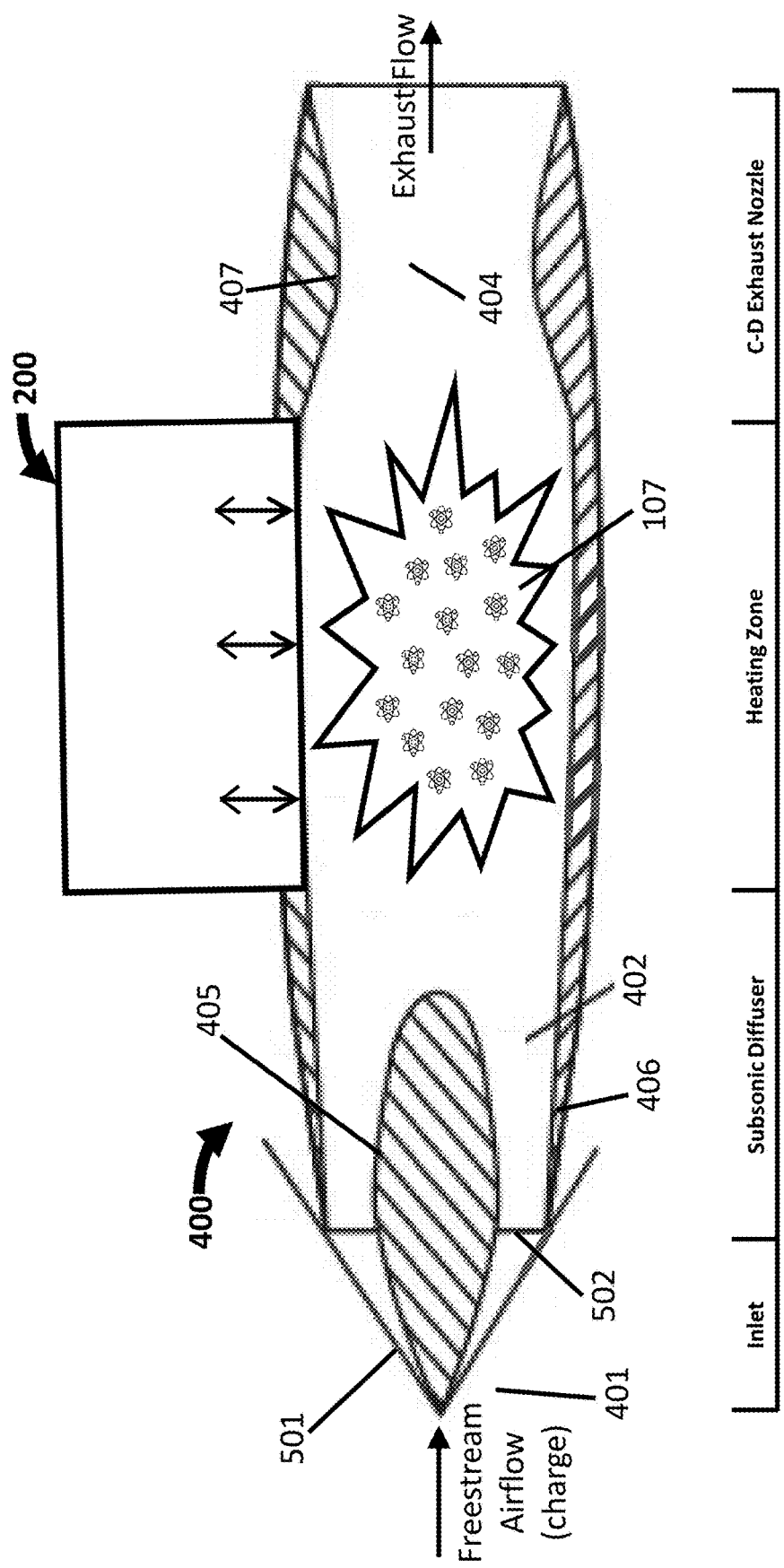
FIG. 3 is a center section schematic of a supersonic flight propulsion system, the EPHVP system, and a notional inlet shock compression

III) SUPERSONIC PROPULSION SYSTEM 400. EPHVP 200, and SHOCK SEQUENCE 501, 502—Ref. FIG. 3: In addition to propulsion systems for hypersonic vehicles, the EPHVP system 200 can also be used for propulsion systems in vehicles that fly up to the supersonic regime. FIG. 3 shows just the charge pathway for an embodiment of a two-geometric-throat supersonic propulsion system 400 and how the EPHVP 200 system can be integrated with such.

This supersonic propulsion system 400 comprises an inlet section 401, a subsonic diffuser 402, a heating zone 107, and a converging-diverging exhaust nozzle 404. The inlet geometry comprises an inlet spike 405 located along the engine's 400 axis that starts some distance upstream from the engine 400. The radial extent of the inlet spike 405 is less than the inner radius of the engine's annular wall 406 and is shaped such that the incoming supersonic air travels through a converging section and experiences a series of oblique shocks 501, a geometric throat where there is a terminal normal shock 502, and the subsonic diffuser 402 where the transition to subsonic charge air speeds occurs.

The EPHVP 200 has optical access to the heating zone 107 where the $O_2$ molecules are electromagnetically excited and the charge air pressure is increased before the air enters the converging-diverging exhaust nozzle 404 defined by the shape of the engine's annular walls 407 near the downstream end of the engine 400; at the exhaust nozzle, the flow is reaccelerated from subsonic to supersonic flow, and since energy was added to the charge, the result is higher exit velocities than the inlet capture velocities and a positive net thrust.

IV) EPHVP SYSTEM AND METHOD 200 FOR A VEHICLE CAPABLE OF FLYING IN BOTH THE SUPERSONIC AND HYPERSONIC REGIMES—Ref. FIGS. 1-3: The EPHVP 200 may be used in propulsion systems that support a wide range of flight Mach numbers. Such propulsion systems may utilize a variable geometry inlet or duct to set up the appropriate shock system and heating zone entrance charge speed. Regardless of the flight regime, the EPHVP 200 would principally operate in the same manner as discussed earlier.

Figure 4:
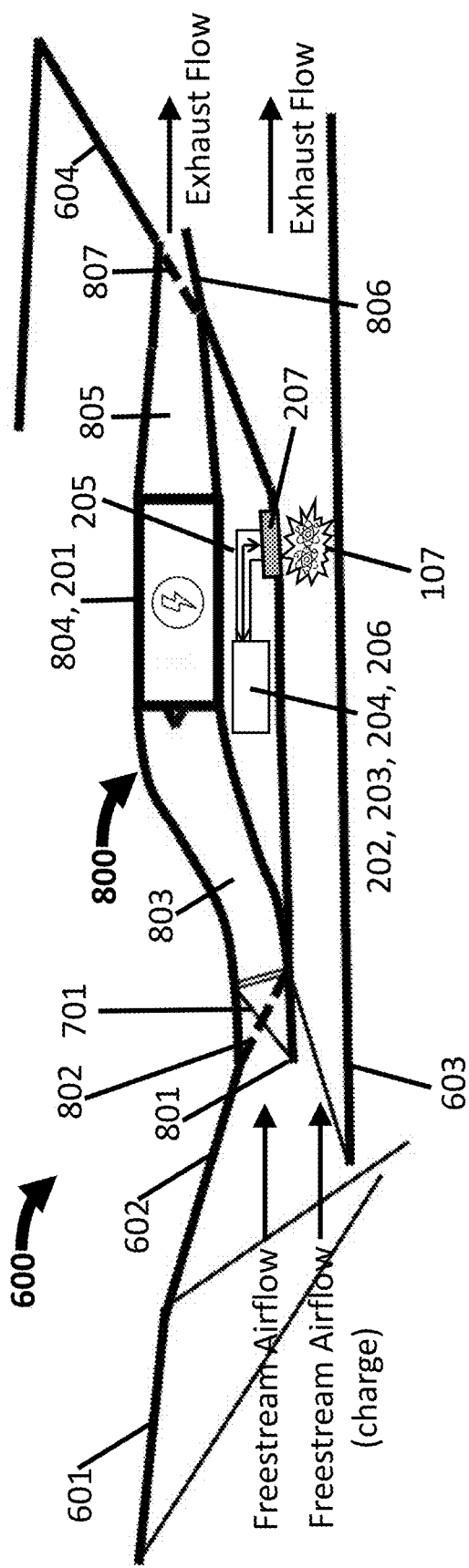
FIG. 4 is a center section schematic of a dual-mode supersonic and hypersonic flight propulsion system embodiment, a notional shock compression expansion sequence, and a gas turbine generator/engine to supply power to the system as well as supply thrust for subsonic and lower supersonic flight regimes

V) EES 201—Ref. FIGS. 1, 2, and 4: The preferred embodiment of the EPHVP power source 201 comprises a megawatt-class and multi-kilovolt hybrid-electric system ("HES") 800. However, the power and voltage levels are scalable with the application. The HES comprises a turboprop gas turbine engine ("GTE") 804, whose charge air handling system further comprises a separate low-speed duct inlet assembly 801-803, compressor, combustion chamber, turbine, exhaust system, and dedicated exhaust diffuser assembly 805-807. The compressor, combustion chamber, turbine, and exhaust system are housed in the "upper" low-speed duct while the charge flow path leading to the heating zone 107 of the supersonic and/or hypersonic propulsion system lies in a separate high-speed duct as shown in FIG. 4. Alternative embodiments of the present invention can have the power generation charge duct side-by-side with the high-speed duct rather than an "over-under" arrangement as shown. An embodiment of the electrical components for the HES comprises a plurality of electric motors/generators, power converters, power transmission, and power control systems.

FIG. 4 shows an embodiment of the host vehicle 600 that contains the HES embodiment of the EES 201 that comprises the air-breathing GTE 804. Since FIG. 4 is a center section view, the structural integration between the main body and ducted housing surrounding the supersonic and/or hypersonic propulsor is not apparent. The host vehicle 600 that the embodiment of the EES 201 comprises one or more ramped inlet facets 601, 602, a ducted housing 603 that at the upstream end which works with the inlet 602 to capture air into the HES's inlet assembly 801-803. At the downstream end of the vehicle 600 is the exhaust diffuser 604.

The entrance to the inlet assembly may include a hinged inlet door that can be in an opened 801 position during GTE operation or closed position 802 when the GTE is not operating. The low-speed inlet assembly 801-803 can be variable as a function of the inlet capture flow rate so that the proper amount is directed or throttled to the GTE 804.

Excess air flowing through this inlet assembly 801-803 may be bled off or bypassed. A portion of the captured freestream air is admitted through the HES 800 when the door is open 801 at a subsonic or supersonic Mach number. If the flow is supersonic at the inlet door 801, the air is slowed down by a shock 701 that forms off the leading edge of the door 801. This shock alternates to expansion waves and back to a compression wave with each successive wall reflection along the HES's inlet manifold 803. The GTE 804 ingests subsonic air at its upstream portion where the inlet manifold 803 ends. An embodiment of the GTE system 800 would have a door or valve that could be open 806 or if not operating, closed 807.

The electrical power generation process is well recognized to those familiar with GTEs 804, where an incoming airstream is compressed and mixed with a chemical fuel before being ignited, burned, and expanded through a turbine that provides shaft power to the compressor and generator before being scavenged. Supporting sub-systems for the GTE 804 further comprises one or more liquid fuel tanks, one or more fuel pumps, one or more feed fuel rails, fuel injectors targeting its spray into the combustion chamber, one or more fuel return lines if the system is the type that returns excess fuel back to the fuel reservoir and an electronic control system that meters the appropriate amount of fuel injected. Mega-watt (MW) and kilovolt (kV) in-flight power generation hybrid electric systems are described in the article by Norris [3]. Embodiments of the GTE system 800 can provide more than power generation, but also supplement thrust for certain operational regimes. The GTE-generated power can be delivered by electrical connection to a battery system to store energy, and/or supercapacitors for short-term high storage with high charge/discharge rate capacity, and/or directly to the rest of the propulsor system 202-207 and heating zone 107 in the same manner as described before in Section II of this disclosure.

For shorter flights or single-use (e.g., missile) applications, an embodiment of the EES 201 may exclude a power generation system and more simply comprise a charged battery with sufficiently high energy density per unit mass and total energy storage capacity to sustain the operation of the rest of the EPHVP and thus flight throughout the intended trajectory. Other alternative embodiments of the EES 201 may be a fuel cell comprising an anode, cathode, and proton exchange membrane to support hydrogen-oxygen redox reactions to charge batteries of sufficiently high energy density per unit mass, charging rate accommodation, and storage capacity. Hydrogen may be sourced from a high-pressure storage tank or from a hydrocarbon fuel with an onboard reformer that separates the hydrogen atoms from carbon atoms.

The preferred capacity embodiment of the EES 201 to support sufficiently high working fluid temperature and pressure increase at the high charge flow rate and short heating zone residence times is high enough that after all power dissipation through the electrical circuit componentry and EPHVP system components 201-207, the delivered microwave power to the $O_2$ molecules is as high as 1 megawatt (MW). A publication on combustion-based hypersonic scramjet inlets by Smart [4] provides a design calculation example that can be applied to the EPHVP system, where the captured inlet air mass flow rate without spillage is $\dot{m}_{air}$=0.5 kg/s. Equation 1 provides a dimensionally consistent relation of the microwave medium (i.e., charge) temperature increase as a function of the inlet air mass flow rate ($\dot{m}_{air}$), specific heat at constant volume ($C_v$), and delivered microwave power ($P_{delivered}$).

$$T_{increase} = \frac{P_{delivered}}{(C_v * \dot{m}_{air})} \quad (1)$$

In combustion-based scramjet, the temperature in the combustor (a.k.a., heating zone 107) is between 2000-3000 K [5]. To illustrate the realizability of the present invention's ability to provide alternative requisite heating in one hypersonic operating condition, assume $C_v$=767 J/kg·K. With 1.0e+06 Watts (Joules/second) and 0.5 kg/sec. mass air flow rate, the microwave energy would heat up the charge air by +2608 K and is comparable to the temperature end-state after combustion.

If one reasonably assumes a 30 km flight altitude of the hypersonic vehicle at one point in its trajectory, the ambient air temperature before inlet shock compression is approximately 226 K, based on U.S. Standard Atmosphere 1976 Revised data. After inlet shock compression, the charge air temperature entering the heating zone would be even higher.

It is important to note that the 60 GHz microwave energy only acts to heat the $O_2$ molecules. Air, however, is typically composed of a plurality of atomic and molecular elements including $O_2$, nitrogen ($N_2$), water ($H_2O$), and other species. At 30 km altitude, the mass fraction of $O_2$ in the air is on the order of 0.10. This does not mean that Eqn. 1's denominator $\dot{m}_{air}$ should be changed to $\dot{m}_{O2}$ and the temperature increase multiplied by a factor of 10. Given that 0.1 is a substantial mass fraction for $O_2$ in air and $O_2$ is homogenously distributed in air, any heating to the $O_2$ molecules will be immediately absorbed by the entire charge air. Hence, Eqn. 1's tabulation of the entire charge, $\dot{m}_{air}$, is proper.

Like combustion-based supersonic and hypersonic combustors, radiative and convective heat transfer losses will reduce the temperature of the charge. However, this section shows that current power generation and delivery technology can support the operation of the EPHVP for hypersonic flight. The demands of supersonic flight are expected to be less than hypersonic flight thanks to the increased residence time in the heating zone 107 if the engine is a dual supersonic-hypersonic capable with a constant streamwise extent of the heating zone 107.

VI) EPHVP SYSTEM 200 AND METHOD FOR A VEHICLE CAPABLE OF FLYING IN SUBSONIC, SUPERSONIC, AND HYPERSONIC REGIMES—Ref. FIGS. 1-4: The presence of a GTE 804 laid out in a manner shown by the embodiment illustrated in FIG. 4 provides the potential for subsonic operation where the GTE 804 provides the primary propulsion or propulsion assistance to the EPHVP system. This would open the possibility for a reusable vehicle to take off and land without the need for a separate carrier vehicle or booster vehicle or the potential to power the first stage of a multi-stage-to-orbit space plane.

VII) EWG 202 AND RF TRANSMISSION—Ref. FIGS. 1, 2, and 4: The preferred embodiment of the EWG 202 is a gyrotron tuned to output microwave energy within the microwave spectrum of the gas species to be excited. For the exemplary application of an air-breathing craft, $O_2$ is the gas species of interest in the charge and $O_2$'s microwave spectrum is 60 GHz. However, unlike the common use to heat plasmas, the EWG 202 in the present invention is intended to heat neutral $O_2$ molecules. Regarding concerns of other potentially dissipative mechanisms, the technology for RF transmission is recognized in the art to be mature and if the matching network does a reasonable job of adjusting the source impedance to be the complex conjugate of the load impedance (low SWR), one can expect that almost all of the energy will be conveyed to the chamber to heat the $O_2$.

VIII) OTHER ALTERNATIVE EMBODIMENTS—Ref. FIGS. 1-4: The ducted housing shown in the various embodiments suggests substantially two-dimensional shock compression and expansion structures. However, the EPHVP 200 may include internal pathway cross-section embodiments such as an axisymmetric duct and propulsion system.

The depicted embodiments of this disclosure are an airframe underbody integrated duct. However, the EPHVP 200 can also be part of a podded propulsion system, where there is a plurality of propulsion inlets, isolators, heating zones, and nozzles overall. On such implementations, embodiments may include a single, centralized EES 201 but with individual EPHVP components 202-207 for each individual engine.

Furthermore, the heating zone 107 of said EPHVP 200 may be in turbojet, turboprop, and turbofan engines for propulsion duty (not shown). With this embodiment, instead of a combustion chamber, a heating zone 107 is placed between a turbojet/turboprop/turbofan engine's compressor and turbine. The RF window 207 and at least a portion of the waveguide 205 is placed within the housing of said turbojet/turboprop/turbofan engine.

The depicted embodiments show an optical access RF window 207 on one side of the heating zone 107. Alternative embodiments of the EPHVP 200 can be arranged such that the RF waves emanate from multiple directions such as from the side walls of the high-speed duct.

The present invention may be generally directed to any system that ingests relatively lower enthalpy oxygen to be eventually converted into a higher enthalpy exhaust charge. Example applications can be a leaf blower, air jet boat, etc. The power requirements and other system capacity sizing would be appropriately scaled to the application of interest.

Many alterations and modifications may be made by those having ordinary skill in the art without departing from the spirit and scope of the embodiment. Therefore, it must be understood that the illustrated embodiment has been set forth only for the purposes of example and that it should not be taken as limiting the embodiment as defined by the following claims. For example, notwithstanding the fact that the elements of a claim are set forth below in a certain combination, it must be expressly understood that the embodiment includes other combinations of fewer, more, or different elements, which are disclosed herein even when not initially claimed in such combinations.

REFERENCES

1. Yoder et al., "Modeling of Turbulent Free Shear Flows," NASA Technical Report NASA/TM, 2013-218072, 2013.
2. Bonanos et al., "Observations on a Supersonic Shear Layer," 47th AIAA Aerospace Sciences Meeting Including The New Horizons Forum and Aerospace Exposition, 2012.
3. Norris, Guy. "GE Claims World First with High-Voltage High-Altitude Power Demo." Aviation Week Network, 19 2022, https://aviationweek.com/shownews/farnborough-airshow/ge-claims-world-first-high-voltage-high-altitude-power-demo.
4. Smart, Michael K., "Scramjet Inlets," R&T Organization, RTO-EN-AVT-185, NATO/OTAN, 2013.
5. Nelson, H. F., "Radiative Heating in Scramjet Combustors," Journal of Thermophysics and Heat Transfer, Vol. 11, No. 1, January-March 1997.

What is claimed is:

1. A system for electromagnetically exciting certain molecules within a volume of gaseous working fluid or charge via transition frequency heating for propulsion, comprising:
an electrical energy source (EES);
an electromagnetic wave generator (EWG);
wherein said EES supplies power to said EWG;
a reflection coefficient measurement device (RCMD) that is electrically coupled to said EWG;
a controllable electrical matching network (EMN);
a proportional integral derivative controller (PIDC);
wherein said RCMD is electrically coupled to said EMN and said PIDC;
wherein said PIDC is electrically coupled to said EMN;
and a propulsor cavity (PC) that is electromagnetically coupled to said EMN;
wherein said PC further comprises a transmission line that comprises a waveguide and a radio frequency (RF) window;
wherein said RF window provides optical access to a heating zone where the charge resides or passes through;
wherein said heating zone resides in the flow path between a propulsion system's charge inlet and nozzle exhaust;
wherein said RCMD transmits an electromagnetic signal through said PC to and from said heating zone;
wherein said heating zone further comprises the location of a final inlet shock.

2. The system as recited in claim 1, wherein reflection coefficient(s) between the EWG and the load characterized by the state of the molecules within the charge in said heating zone targeted for electromagnetic excitation is measurable by said RCMD, said RCMD being a standing-wave ratio (SWR) sensor or vector network analyzer (VNA).

3. The system as recited in claim 2, wherein said heating zone is placed between a turbojet/turboprop/turbofan engine's compressor and turbine, wherein said RF window and at least a portion of the waveguide is placed within the housing of said turbojet/turboprop/turbofan engine.

4. The system as recited in claim 2, wherein said SWR sensor comprises an RF test instrument, one or more directional couplers, antennae bridge circuits, or a combination of one or more directional couples and bridge circuits.

5. The system as recited in claim 1, wherein said EES includes one or more of the following elements comprising:
a battery;
a supercapacitor;
a hydrogen fuel cell; and/or
a turboprop gas turbine engine (GTE) powered by a combustible fuel and oxidizer;
said GTE having a plurality of electric motors/generators, wherein a turbine in said GTE is electrically connected to power converters, power transmission, and power control systems.

6. The system as recited in claim 1, wherein said EWG is a gyrotron tuned to output millimeter-wave microwave energy at 60 GHz for exciting and heating the oxygen ($O_2$) in said charge.

7. A system for electromagnetically exciting certain molecules within a volume of gaseous working fluid or charge via transition frequency heating for propulsion, comprising:
an electrical energy source (EES);
an electromagnetic wave generator (EWG);
wherein said EES supplies power to said EWG;
a reflection coefficient measurement device (RCMD) that is electrically coupled to said EWG;
and a propulsor cavity (PC);
wherein said PC further comprises a transmission line that comprises a waveguide and a radio frequency (RF) window;
wherein said RF window provides optical access to a heating zone where the charge resides or passes through;
wherein said heating zone resides in the flow path between a propulsion system's charge inlet and nozzle exhaust;
wherein said RCMD transmits an electromagnetic signal through said PC to and from said heating zone;
wherein said heating zone further comprises the location of a final inlet shock.

8. The system as recited in claim 7, further comprising:
a controllable electrical matching network (EMN); and
a proportional integral derivative controller (PIDC).

9. The system as recited in claim 8, wherein said system is configured such that:
said RCMD is electrically coupled to said EMN and said PIDC;
said PIDC is electrically coupled to said EMN;
said EMN is electromagnetically coupled to the PC.

10. The system as recited in claim 9, wherein reflection coefficient(s) between the EWG and the load characterized by the state of the molecules within the charge in said heating zone targeted for electromagnetic excitation is measurable by said RCMD, said RCMD being a standing-wave ratio (SWR) sensor or vector network analyzer (VNA).

11. The system as recited in claim 10, wherein said SWR sensor comprises an RF test instrument, one or more directional couplers, antennae bridge circuits, or a combination of one or more directional couples and bridge circuits.

12. The system as recited in claim 7, wherein said EES includes one or more of the following elements comprising:
a battery;
a supercapacitor;
a hydrogen fuel cell; and/or
a turboprop gas turbine engine (GTE) powered by a combustible fuel and oxidizer;
said GTE having a plurality of electric motors/generators, wherein a turbine in said GTE is electrically connected to power converters, power transmission, and power control systems.

13. The system as recited in claim 7, wherein said EWG is a gyrotron tuned to output millimeter-wave microwave energy at 60 GHz for exciting and heating the oxygen ($O_2$) in said charge.

14. A method for electromagnetically exciting target molecules within the charge in said heating zone using the system as recited in claim 8, comprising:
A) generating power from said EES and supplying the power to said EWG;
B) generating microwave energy from said EWG and delivering said energy to said PC and charge in said heating zone.

15. The method as recited in claim 14, wherein the reflection coefficient(s) are based on a standing-wave ratio (SWR).

16. The method as recited in claim 14, wherein the reflection coefficient(s) are based on an S11 parameter, which is based on how much power of a delivered microwave signal is reflected back from said load along said transmission line.

17. The method as recited in claim 14, wherein the microwave energy from said EWG is at a frequency within the microwave spectrum of at least one gas species of said charge.

18. The method as recited in claim 14, wherein the microwave energy from said EWG is a 60 GHz millimeter-wave signal corresponding to the microwave spectrum of diatomic oxygen ($O_2$) molecules wherein said RCMD transmits an electromagnetic signal through said PC to and from said heating zone.

19. The method as recited in claim 14, further comprising:
A) calculating the reflection coefficient(s) between the EWG and the load;
B) monitoring the reflection coefficient(s) using a proportional integral derivative controller (PIDC) and adjusting a controllable electrical matching network (EMN) to provide requisite heating of said charge with the minimum possible input energy.

\* \* \* \* \*